Feb. 7, 1939.  J. W. WEST  2,145,906
FROZEN CONFECTIONERY MOLDING APPARATUS
Filed May 3, 1937  3 Sheets-Sheet 1
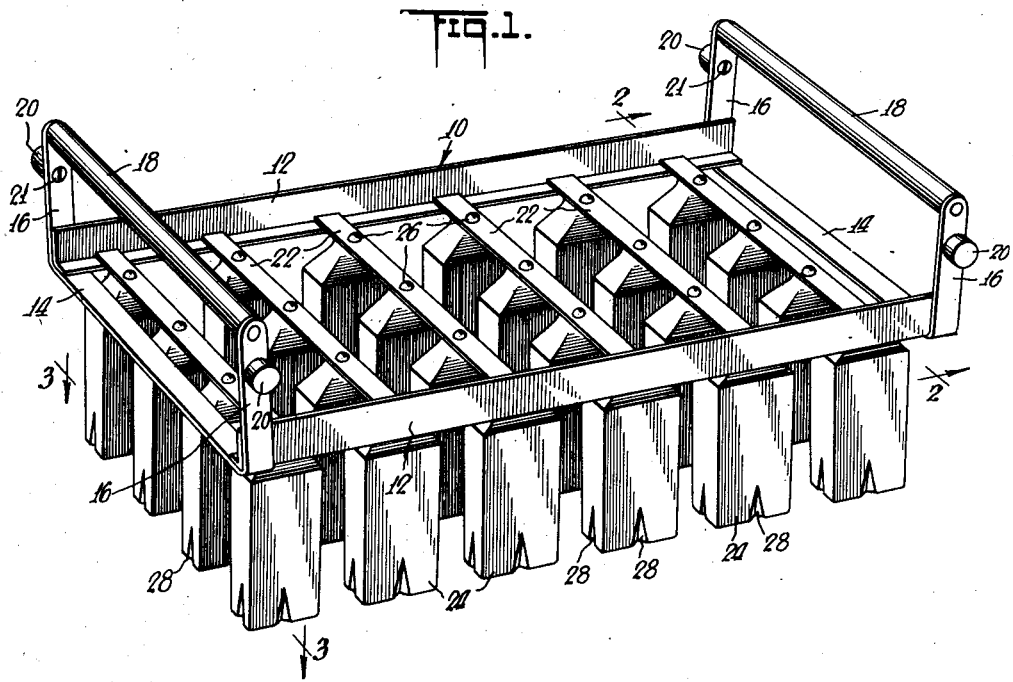
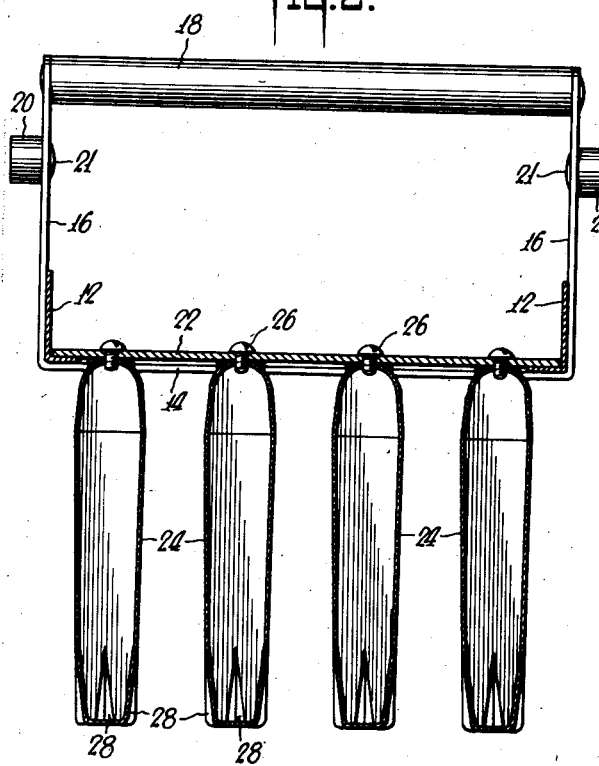
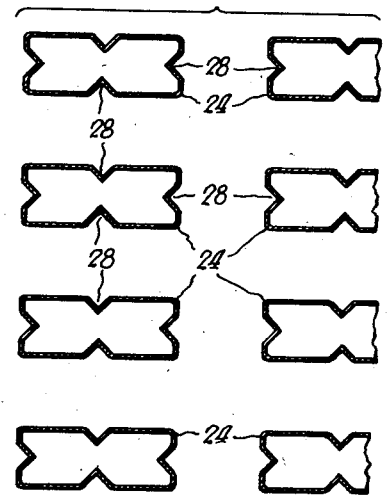
INVENTOR
John W. West
BY
ATTORNEY

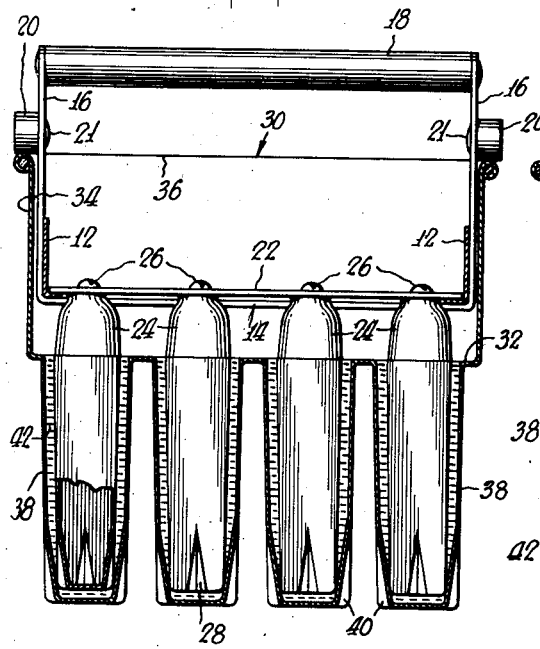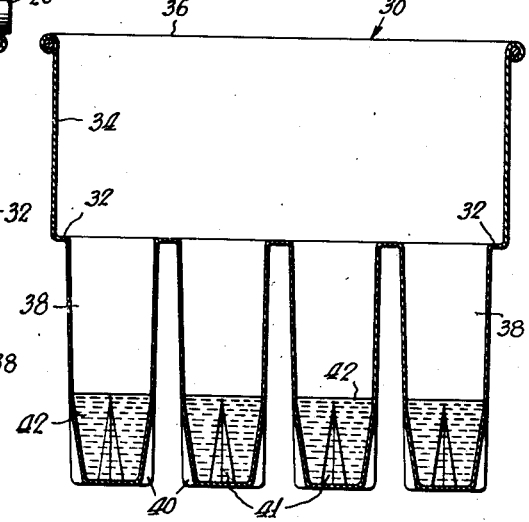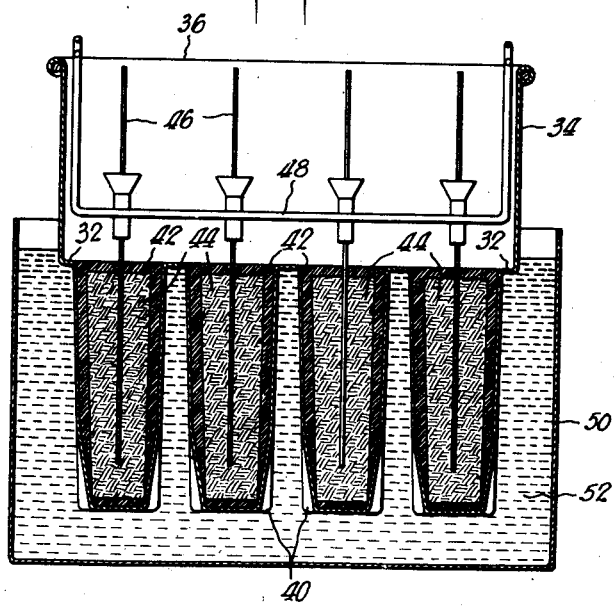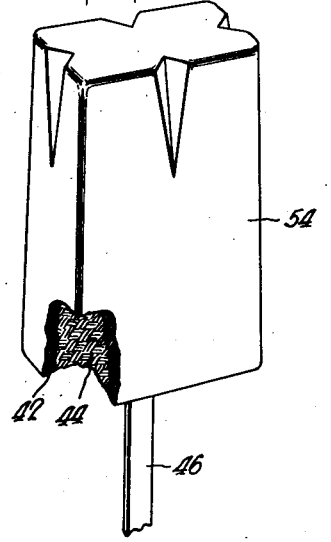

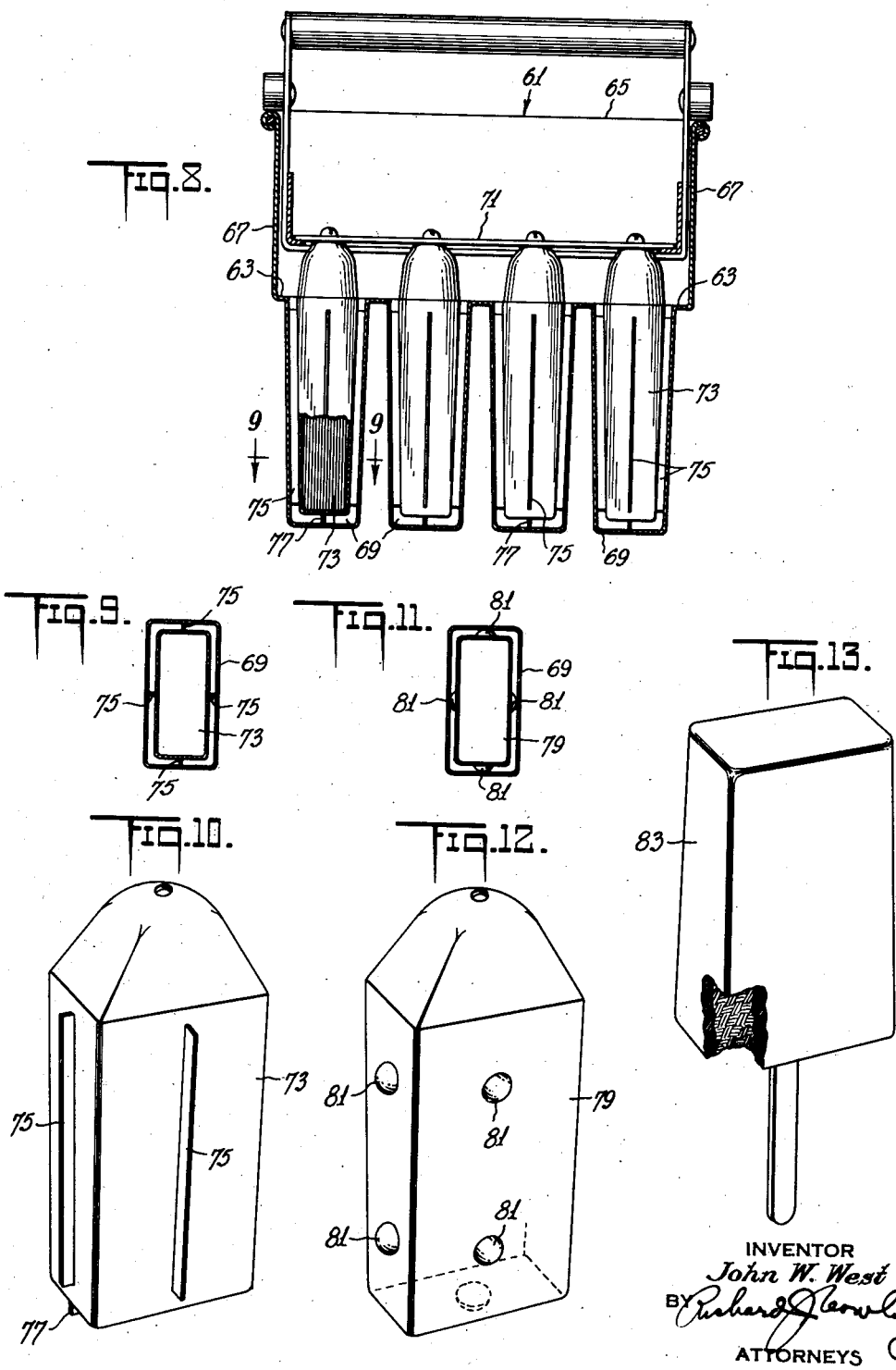

Patented Feb. 7, 1939

2,145,906

UNITED STATES PATENT OFFICE 2,145,906

FROZEN CONFECTIONERY MOLDING APPARATUS

John W. West, Maplewood, N. J., assignor to Joe Lowe Corporation, New York, N. Y., a corporation of Delaware Application May 3, 1937, Serial No. 140,347

2 Claims. (Cl. 107—8)

The present invention relates generally to apparatus adapted for use in the manufacture of composite or multi-flavored frozen confectionery products, and it has particular relation to apparatus for partially filling the individual cavities of a multi-cavity mold with a given quantity of fluid material to be frozen.

Heretofore, the manufacture of composite or multi-flavored frozen confectionery products, which consist of two or more separately flavored substances, or of two or more layers of the same substance but of different flavors and of contrasting colors, presented a problem of great difficulty in the partial filling of a multi-cavity mold structure, having a plurality of spaced dependent individual mold cavities, with uniform measured quantities of material in a cheap, efficient and sanitary manner. In the past it has either been necessary to carry out this step in the process by manually filling the individual cavities of the mold structure with separately measured quantities of material, or to utilize a large and expensive filling machine of a complicated construction. In the former practice of manual filling, the operation was highly inefficient, expensive and time consuming; and in the latter case where the automatic filling machine was employed the initial installment cost was prohibitive for a majority of the manufacturers, and the upkeep, repair and investment was not warranted for the production of the average plant, and particularly is this true when consideration is given to the fact that the finished product has an extremely low sales price.

One object of the present invention is to provide a simple and efficient portable displacing and proportioning device of an inexpensive construction, which is not only highly durable, but easy to clean, light in weight and entirely free of moving parts.

Another object of the invention is the provision of a simple and inexpensive portable device adapted to be suspended over a conventional multi-cavity mold structure for simultaneously allocating and uniformly partially filling the individual cavities thereof from a predetermined quantity of fluid material which is merely poured into said mold structure.

A further object of the invention is to provide a simple and efficient portable displacing and proportioning device, having removable displacer units which can be quickly and easily changed to vary the amount of fluid material desired to be allocated to each individual mold cavity.

Other and further objects and advantages of the invention reside in the detailed construction of the apparatus, which result in simplicity, economy and efficiency, and which will be apparent from the following description, wherein preferred forms of embodiment of the invention are shown, reference being had to the accompanying drawings, forming a part hereof, in which:

Fig. 1 is a perspective view of a portable displacing and proportioning device constructed in accordance with the invention;

Fig. 2 is a cross-sectional view of the apparatus shown in Fig. 1, the same being taken along the lines 2—2 thereof, looking in the direction of the arrows;

Fig. 3 is a fragmentary cross-sectional view of the apparatus shown in Fig. 1, the same being taken along the lines 3—3 thereof, looking in the direction of the arrows;

Fig. 4 is a cross-sectional view of the portable displacing and proportioning device shown in Fig. 1, illustrating the manner in which it is suspended over a conventional mold structure having a plurality of pendant mold cavities; and showing the operation of the manner of allocating and measuring the fluid material for each mold cavity;

Fig. 5 is a cross-sectional view of the mold structure shown in Fig. 4, with the portable displacing and proportioning device removed, and illustrating the position of the allocated fluid in the individual mold cavities;

Fig. 6 is a cross-sectional view of the mold structure shown in Fig. 4, showing the partially filled material being displaced with an inner mold frozen core bonded to a handle member and securely fastened in a portable stick-centering device and carrier, the same being also shown in a brine tank under refrigerating conditions for the purpose of freezing the liquid enrobing material;

Fig. 7 is a perspective view of the completed composite or multi-flavored frozen confectionery product made with the apparatus illustrated in Figs. 1 to 6, inclusive, having parts broken away to show the position of the different substances;

Fig. 8 is a cross-sectional view of a modified form of conventional mold having a modified form of portable displacing and proportioning device, which is constructed in accordance with the invention, suspended thereover;

Fig. 9 is a fragmentary sectional view of the apparatus shown in Fig. 8, the same being taken along the line 9—9 thereof, looking in the direction of the arrows;

Fig. 10 is a perspective view of one of the displacer units of the portable displacing and proportioning device shown in Fig. 8;

Fig. 11 is a fragmentary cross-sectional view of another modified form of displacer unit, showing the same positioned within one of the mold cavities of the conventional mold shown in Fig. 8;

Fig. 12 is a perspective view of the displacing unit shown in Fig. 11; and

Fig. 13 is a perspective view of a completed composite frozen confectionery product of the type to be made with the multi-cavity mold and modified forms of displacing and proportioning devices shown in Figs. 8 to 12, inclusive, and having parts broken away to show the relative position of the different substances.

Referring now to Figs. 1 to 7 of the drawings, there is shown in Fig. 1 a portable displacing and proportioning device 10, consisting of a pair of spaced angle iron longitudinal supporting members 12 suitably secured adjacent each end thereof by transversely extending U-shaped end frames 14, having upwardly extending arms 16 provided with handle gripping members 18 mounted transversely adjacent the upper ends thereof. Stops 20 are suitably mounted by screws 21 intermediate the ends of the upwardly extending arms 16 of the U-shaped frames 14, providing means for suspending the portable carrier device 10 over a conventional multi-cavity mold.

Transversely extending flat supporting members 22 are mounted between the angle iron frame members 12, and are secured thereto by spot-welding or other suitable fastening means. The members 22 are uniformly spaced longitudinally of the frame supporting structure of the device 10. Hollow displacer units, 24, made of non-corrosive, stainless, metal, are removably mounted to the underside of the supporting members 22 by machine screws 26. The units 24 are smaller in cross-sectional dimensions than the mold cavities with which they are intended to be used, and are of a greater length than the depth of said cavities for reasons hereinafter more fully explained. Means in the form of upwardly extending and tapering indentations 28 are positioned adjacent the lower ends of the displacer units 24.

Referring now to Figs. 4, 5 and 6, there is shown the manner in which the device 10 is adapted to be used in conjunction with a multi-cavity mold of conventional construction. The mold structure 30 consists of a mold pan 32, having upstanding sidewalls 34 and end walls 36, and a plurality of integrally formed individual open-top mold cavities 38 depending therefrom, which are provided adjacent the lower closed bottoms thereof with a plurality of inwardly projecting perimetrically spaced and upwardly tapering ribs 40. The specific features of this conventional form of mold comprises no part of the invention covered by this application.

The portable displacing and proportioning device 10 is suspended over the mold structure 30, the stops 20 of the device 10 resting upon the upper edges of the sidewalls 34 thereof, and supporting the majority of the weight of the device 10. In this position the displacer units 24, being correspondingly spaced on the frame structure of the device 10 to the spacing arrangement of the individual cavities of the mold structure 30, extend downwardly with one spacer unit 24 extending into each mold cavity 38, the indentations 40 on the lower portion of said displacer units 24 engage the correspondingly shaped projecting ribs 40 of the mold cavity 38, thereby accurately positioning and centering the displacer unit 40 axially in spaced relation to the inner surfaces of the mold cavity 38. It will be noted that the upper parts of the displacer units 24 extend above the tops of the individual mold cavities 38 and the mold pan 32.

With the portable displacing and proportioning device 10 superimposed over the mold structure 30, as above described, a predetermined amount of fluid material 42, equal in volume to the combined cubical dimensions of the spaces between the displacer units 24 and the inner surfaces of the mold cavities 38, may be poured into the mold pan 32 of the mold structure 30. The displacer units 24 will prevent more than the desired amount of liquid material 42 to flow into each mold cavity 38, thereby allocating to each individual mold cavity 38 its proportionate amount of fluid material. The fact that the displacer units 24 extend above the tops of the mold cavities 38 and the mold pan 32 prevents more than the desired amount to flow into any one mold cavity at any time, thereby causing any excess material to be diverted into any unfilled mold cavities.

Upon removal of the portable displacing and proportioning device 10, with its depending displacer units 24, from the mold structure 30, the fluid material 42 in each mold cavity 38 will gravitate to the bottom of said cavities, as best shown in Fig. 5.

A preformed confectionery core 44, which has been suitably bonded to a handle member 46 in any suitable manner, is shown secured in spaced depending relation in a portable carrier 48. These cores 44 may be inserted into the mold structure 30, with the individual cores extending into the fluid material 42 in each mold, thereby displacing a portion of the material 42 and causing it to rise up in the mold cavity 38 around the remainder of the core to completely enrobe the same, as best shown in Fig. 6. The mold structure 30 and contents are now ready to be positioned in a brine tank 50, containing circulating refrigerating brine 52, and allowed to remain therein until the fluid material 42 is completely frozen and bonded to the frozen core 44. Thereupon, the mold structure 30 is removed from the brine 52, and the finished frozen confectionery products 54, which are shown in Fig. 7, may be removed from their respective mold cavities 38 in any suitable manner. No claim is made herein to the novel form of the finished product shown in Fig. 7 hereof, which has been used solely for illustrative purposes, it being understood that the subject-matter thereof forms the basis of a co-pending design application filed by the inventor Norman M. Thomas on even date herewith, and given Serial No. D-69,123, now Letters Patent Design No. 105,151, issued June 29, 1937.

Referring now to Figs. 8 to 13 of the drawings, there is shown a modified form of conventional multi-cavity mold 61, consisting of a mold pan 63, having upstanding sidewalls 65 and end walls 67, and a plurality of integrally formed individual open-top mold cavities 69 depending therefrom.

The portable displacing and proportioning device 71, shown in Figs. 9 and 10, is constructed identically to the device 10 except that instead of the depending displacer units 24 a modified form of displacer unit 73 is substituted. These substituted hollow metal displacer units 73 are provided with a plurality of longitudinally extending ribs 75, which are spaced perimetrically thereof, and a transversely extending bottom rib 77.

The modified form of displacer unit 79, shown in Figs. 11 and 12, may be substituted for the displacer units 73 in the displacing and proportioning device 71. In this form of displacer unit, the means for engaging the inner surfaces of the mold cavities 69 are shown in the form of semi-spherical protuberances 81, a plurality of which are mounted in spaced relation on each of the faces of the displacer unit 79.

The form of completed composite frozen confectionery product 83 produced with the mold and modified forms of displacing and proportioning device 71, is depicted in Fig. 13, wherein parts have been broken away to show the relative position of the different substances.

Although I have only described in detail several forms which my invention may assume, it will be readily apparent to those skilled in the art that the invention is not so limited, but that various other modifications may be made therein without departing from the spirit thereof or from the scope of the appended claims.

What I claim is:—

1. In apparatus for molding a plurality of composite frozen confections simultaneously wherein a multi-cavity mold having a plurality of spaced cavities, which are to be partially filled with a liquid syrup to be frozen are each provided with spaced inwardly projecting upwardly tapered longitudinal ribs, the combination with said mold of a portable displacing device having a plurality of correspondingly spaced displacer units depending therefrom and extending one each into said mold cavities, said displacer units having spaced indentations adapted to engage said inwardly projecting ribs of said mold cavities to position and thereby maintain each of said units in uniform spaced relation to the inner walls of said cavities.

2. In apparatus for molding a plurality of composite frozen lonfections simultaneously wherein a multi-cavity mold having a plurality of spaced cavities, which are to be partially filled with a liquid syrup to be frozen are each provided with spaced inwardly projecting upwardly and outwardly tapered longitudinal ribs, the combination with said mold of a portable displacing device having a plurality of correspondingly spaced displacer units depending therefrom and extending one each into said mold cavities, said displacer units having spaced inwardly and downwardly tapered indentations for engaging said inwardly projecting upwardly and outwardly tapered longitudinal ribs of said mold cavities to position and thereby maintain each of said units in uniform spaced relation to the inner walls and bottom of said mold cavities.

JOHN W. WEST.